United States Patent

Stupecky

(10) Patent No.: US 7,578,165 B1
(45) Date of Patent: Aug. 25, 2009

(54) MEASUREMENT APPARATUS AND METHODS FOR BALLOON CATHETERS

(75) Inventor: Josef J. Stupecky, Laguna Niguel, CA (US)

(73) Assignee: Interface Associates, Inc., Laguna Niguel, CA (US)

( * ) Notice: Subject to any disclaimer, the term of this patent is extended or adjusted under 35 U.S.C. 154(b) by 400 days.

(21) Appl. No.: 11/303,545

(22) Filed: Dec. 16, 2005

Related U.S. Application Data (60) Provisional application No. 60/637,421, filed on Dec. 17, 2004.

(51) Int. Cl.
G01B 21/12 (2006.01)
G01B 11/00 (2006.01)

(52) U.S. Cl. .................................. 73/1.81; 356/627

(58) Field of Classification Search .............. 73/1.79, 73/1.81, 104; 356/625, 627, 635
See application file for complete search history.

(56) References Cited

U.S. PATENT DOCUMENTS

| | | | | |
|---|---|---|---|---|
| 4,384,470 | A * | 5/1983 | Fiore .......................... 73/1.68 |
| 4,651,738 | A * | 3/1987 | Demer et al. ................ 606/194 |
| 4,781,192 | A * | 11/1988 | Demer ........................ 606/195 |
| 5,105,091 | A * | 4/1992 | Igarashi et al. ......... 250/559.24 |
| 5,142,160 | A * | 8/1992 | Storbeck ................ 250/559.08 |
| 5,171,299 | A * | 12/1992 | Heitzmann et al. ...... 604/100.03 |
| 5,184,733 | A * | 2/1993 | Arnarson et al. ............ 209/585 |
| 5,304,340 | A * | 4/1994 | Downey ..................... 264/521 |
| 5,841,541 | A * | 11/1998 | Dlugos ....................... 356/634 |
| 5,960,379 | A * | 9/1999 | Shimizu et al. ............. 702/155 |
| 6,141,106 | A * | 10/2000 | Blum .......................... 356/635 |
| 6,453,729 | B1 * | 9/2002 | Muto et al. .................. 73/104 |
| 6,701,633 | B2 * | 3/2004 | Ohtsuka ...................... 33/552 |
| 7,126,694 | B1 * | 10/2006 | Bachalo ...................... 356/484 |
| 7,290,352 | B2 * | 11/2007 | Deferme et al. .............. 33/654 |
| 7,314,461 | B2 * | 1/2008 | Carter et al. ............. 604/96.01 |
| 2007/0055301 | A1 * | 3/2007 | Campbell et al. ........... 606/192 |

(Continued)

FOREIGN PATENT DOCUMENTS

BE 863490 A * 2/1978

(Continued)

OTHER PUBLICATIONS

Lumetrics, "Sample Measurement Testing—Medical Balloons," 2002, Web document.*

*Primary Examiner*—John Fitzgerald
(74) *Attorney, Agent, or Firm*—Knobbe, Martens, Olson & Bear, LLP (57) ABSTRACT

Measurement devices and methods for measuring balloon catheters are provided. Embodiments enable measuring the outer dimensions and burst pressure of a balloon catheter. The measurement apparatus can measure a balloon catheter in ambient air or a balloon catheter submerged in a heated water bath. In ambient air, an axial drive mechanism translates the balloon catheter in an axial direction and a rotary drive mechanism rotates the balloon catheter while a measurement device is used to measure balloon catheter dimensions. In a water tank, an axial drive mechanism translates the balloon catheter in an axial direction while a measurement device is used to measure the burst pressure of the balloon catheter. The devices and methods can utilize a laser micrometer in order to provide such measurements. A control unit provides a user interface and is capable of displaying real time data during the measurement process.

31 Claims, 10 Drawing Sheets

U.S. PATENT DOCUMENTS

2008/0051760 A1* 2/2008 Schoenle et al. ............ 604/523
2008/0097301 A1* 4/2008 Alpini et al. ........... 604/103.07
2008/0157444 A1* 7/2008 Melsheimer ................ 264/514
2008/0228138 A1* 9/2008 van Sloten et al. ....... 604/103.1

FOREIGN PATENT DOCUMENTS

CA        2043346 A   *  1/1993
WO        WO 9640350 A1 * 12/1996

* cited by examiner

MEASUREMENT APPARATUS AND METHODS FOR BALLOON CATHETERS

CROSS-REFERENCE TO RELATED APPLICATIONS

This application claims priority under 35 U.S.C. § 119(e) to U.S. Provisional Application Ser. No. 60/637,421 filed on Dec. 17, 2004, the entire content of which is hereby incorporated by reference.

BACKGROUND OF THE INVENTION

1. Field of the Invention

The present invention generally relates to balloon catheters. More particularly, the present invention relates to devices and methods used to measure various parameters of balloon catheters.

2. Description of the Related Art

A balloon catheter generally comprises an inflatable balloon that is mounted along a distal end of an elongate catheter body (i.e., shaft). Balloon catheters are used by physicians in a wide variety of therapeutic procedures. In one common use, a folded and wrapped balloon catheter is advanced through a blood vessel to a region that has become occluded by atherosclerotic plaque. The balloon is inflated to dilate the occluded region and thereby improve the flow of blood through the vessel. In another common use, an expandable stent is provided along the exterior of the balloon. The balloon is advanced to the treatment site and is then inflated to deploy the stent. The balloon is then deflated and the balloon catheter is withdrawn from the patient. The expanded stent remains in the blood vessel to provide support to the vessel wall.

SUMMARY OF THE INVENTION

During use, it is important that balloon catheters inflate in a predictable manner. It has been found that undesirable variations in balloon size and/or defects in the balloon may create serious problems, with potentially fatal consequences, during treatment. Embodiments disclosed herein improve quality control of manufactured catheter balloons and, more particularly, provide devices and methods for accurately measuring the dimensions and burst pressure of manufactured balloon catheters.

In one embodiment of the present balloon catheter measurement device, an apparatus for measuring the dimensions of an inflated balloon catheter is provided. The apparatus includes a base plate and a laser measurement device disposed over a portion of the base plate. A measurement block is also disposed over a portion of the base plate and includes an upper surface having a channel. An axial drive mechanism is coupled to an upper surface of the measurement block. The axial drive mechanism includes a mounting platform and is capable of translating in an axial direction back and forth across the laser measurement device. A rotary drive mechanism is also provided and is capable of being attached to and detached from the axial drive mechanism. The rotary drive mechanism comprises a holding unit for holding a balloon catheter in an axial direction and the rotary drive mechanism can rotate the balloon catheter in a clockwise and counter-clockwise direction about a central axis. Also provided is a control unit coupled to the axial drive mechanism and the rotary drive mechanism which provides a user interface capable of controlling, among other things, axial translation and rotation of the balloon catheter. In addition, a tube is coupled to the rotary drive mechanism for providing gas so as to inflate the balloon catheter prior to measuring its outer dimensions.

A method for measuring the dimensions of an inflated balloon catheter is also provided herein. Such method comprises the steps of providing a balloon catheter measurement apparatus, mounting a balloon catheter to a holding unit of a rotary drive mechanism, actuating an axial drive mechanism so as to translate the balloon catheter in an axial direction across a measurement device, actuating the rotary drive mechanism for rotating the balloon catheter so as to permit the measurement device to measure the outer surface of the balloon catheter, and finally using the measurement device to measure particular dimensions of the balloon catheter.

In another embodiment of the present invention, an apparatus for measuring the dimensions of an inflated balloon catheter includes a measurement device and a measurement block located substantially near the measurement device. An axial drive mechanism is coupled to the measurement device and is capable of translating in an axial direction. Also provided is a rotary drive mechanism coupled to the axial drive mechanism for rotating a balloon catheter about a central axis defined by the balloon catheter. A control unit is coupled to both the axial drive mechanism and rotary drive mechanism for controlling movement of the balloon catheter.

Other embodiments of the present invention provide an apparatus for measuring the burst pressure of an inflated balloon catheter. For example, in one embodiment, a base plate is provided in which a laser measurement device and a measurement block are disposed at least partially over such base plate. The measurement block has an upper surface with a channel for holding an axial drive mechanism. The axial drive mechanism has a mounting surface located on an upper surface of the axial drive mechanism. The axial drive mechanism is capable of translating in an axial direction back and forth across the laser measurement device. A water tank can be attached to and detached from the mounting platform of the axial drive mechanism. The water tank has a holding unit for holding a submerged balloon catheter and the tank is capable of holding a desired quantity of liquid. The water tank also includes a heater cartridge disposed on a portion of the bottom surface of the water tank for providing heat to the liquid contained in the water tank. Also provided in this embodiment is a control unit coupled to the axial drive mechanism and the water tank which provides a user interface capable of controlling, among other things, axial translation, water temperature, and water pressure. In addition, a tube is coupled to the water tank for providing water so as to inflate the submerged balloon catheter with water prior to measuring its burst pressure.

A method for measuring the burst pressure of an inflated balloon catheter includes the initial step of providing a balloon catheter measurement apparatus comprising an axial drive mechanism and a tank. Such method also includes the steps of mounting a balloon catheter to a holding unit of a tank wherein the balloon catheter is submerged in liquid, inflating the submerged balloon catheter, actuating an axial drive mechanism for translating the submerged inflated balloon catheter across a measurement device, and using the measurement device to measure particular characteristics of the submerged inflated balloon catheter.

In another embodiment, an apparatus for measuring the burst pressure of an inflated balloon catheter is provided. The apparatus includes a measurement device and a measurement block disposed substantially near the measurement device. An axial drive mechanism is coupled to the measurement device and is capable of translating in an axial direction. A tank is coupled to the axial drive mechanism and is capable of holding liquid and also is capable of holding a balloon catheter submerged in such liquid. A control unit is coupled to both the axial drive mechanism and the tank for controlling movement of the balloon catheter and also for controlling the water temperature and pressure inside the tank.

BRIEF DESCRIPTION OF THE DRAWINGS

These and other features, aspects, and advantages of the present invention will now be described in connection with preferred embodiments of the invention, in reference to the accompanying drawings. The illustrated embodiments, however, are merely examples and are not intended to limit the invention. The drawings include the following ten figures.

DETAILED DESCRIPTION OF THE PREFERRED EMBODIMENTS

The balloon catheter measurement system described herein includes a variety of clamping devices and attachments that allow balloon pressurization, either by gas or water, during the measurement process. In one application, balloon catheter testing is conducted in ambient air. In another application, balloon catheter testing is conducted with the balloon catheter submerged in a bath of heated water. In either application, the system may be used to accurately control balloon axial movement and rotation with respect to a measurement device, preferably a laser measurement device. When the testing is performed in a heated water bath, the system maintains a pre-programmed balloon pressure while simultaneously controlling the temperature of the water bath.

The measurement system is capable of delivering extremely accurate and repeatable results and therefore provides a substantial improvement over the existing art in the field. As a result, the laser measurement system ensures excellent quality in balloon development and production. Advantageously, the measurement procedure is substantially controlled by an automated test program. During use, the test program can be executed and test data can be automatically collected using a user interface such as a PC. During the measurement process, the laser measurement system scans and maps the outline of substantially the entire balloon catheter. Preferably, the measurement system is employed indoors at an ambient air temperature of 5° C. to 40° C. with a relative humidity of 10% to 80%. After measuring is completed, the test results preferably are presented in both graphical and tabular form.

Figure 1:
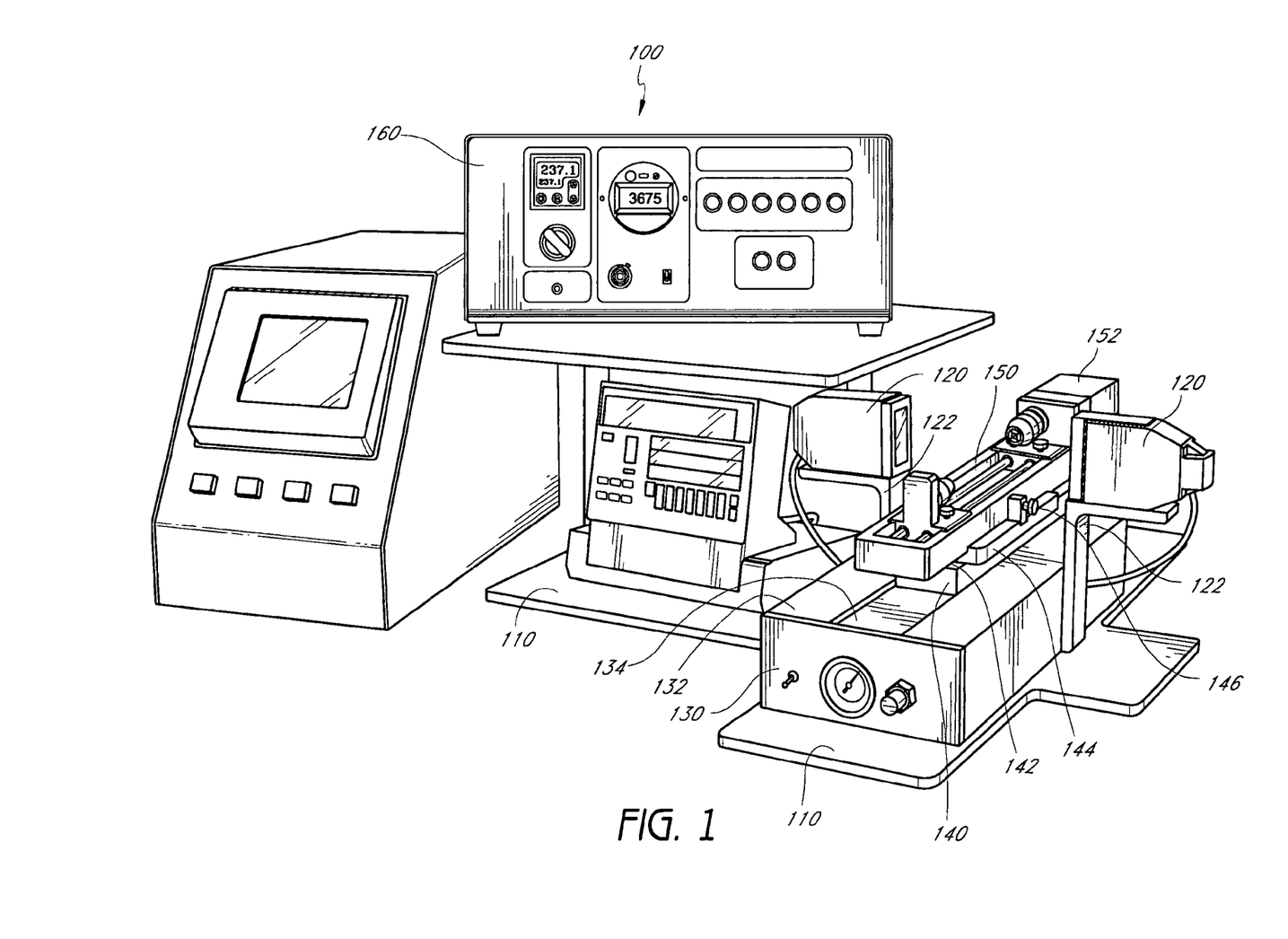
FIG. 1 is a perspective view of a balloon catheter measurement apparatus for measuring the dimensions of a balloon catheter.

FIG. 1 shows a balloon catheter measurement apparatus 100 that is used to measure the dimensions of an inflated balloon catheter. As used herein, the terms "axial" and "axially" refer to translating and measuring a balloon catheter in a direction generally parallel to the longitudinal axis of a balloon catheter mounted on the balloon catheter measurement apparatus 100. In one embodiment, the balloon catheter measurement apparatus 100 includes a base plate 110. The base plate 110 provides a horizontal surface upon which components of the balloon catheter measurement apparatus can be mounted. For example, in one embodiment, a measurement device 120 and a measurement block 130 are mounted on the base plate 110.

The balloon catheter measurement apparatus 100 is preferably configured to be used on a standard tabletop or countertop in an industrial location. Advantageously, the base plate 110 provides a uniform surface for various components of the balloon catheter measurement apparatus 100, including the measurement device 120 and the measurement block 130, to be placed as opposed to such components being placed directly on the tabletop or countertop in an industrial location. The tabletop or countertop space required to house the balloon catheter measurement apparatus 100 can vary. However, in one embodiment, the balloon catheter measurement apparatus 100 is approximately 72 inches wide and 30 inches deep. In another embodiment, the balloon catheter measurement apparatus 100 weighs approximately 19.5 kg or 43.0 lbs.

In one embodiment, the measurement block 130 is substantially rectangular in configuration and disposed on the base unit 110. The measurement block 130 can include an upper surface 132 upon which other components of the balloon catheter measurement apparatus 100 can be mounted. In addition, the measurement block 130 can include a channel 134 on the upper surface 132 of the measurement block 130. The channel 134 preferably comprises a rectangular recess in the upper surface 132 of the measurement block 134 such that the channel 134 is capable of holding an axial drive mechanism 140. The channel 134 provides a means for the axial drive mechanism 140 of the balloon catheter measurement apparatus 100 to fit within at least a portion of the measurement block 130.

In one embodiment, the base plate 110 and the measurement device 130 comprise components machined from an aluminum alloy. Other components of the balloon catheter measurement apparatus 100 can also comprise machined aluminum alloy components. However, the components of the balloon catheter measurement apparatus 100 can be manufactured in a variety of ways and are not limited to being machined components. In addition, the components, including the base plate 110 and the measurement device 130, need not be composed of an aluminum alloy material. Other suitable materials may be used in components of the balloon catheter measurement apparatus 100 including, but not limited to, steel, copper, and plastic.

The axial drive mechanism 140 is capable of translating in an axial direction along the length of the measurement block 130. As such, the axial drive mechanism 140 can move back and forth relative to a measurement area of the balloon catheter measurement apparatus 100 such that the dimensions of a balloon catheter can be measured. In one embodiment, the axial drive mechanism 140 includes an upper surface 142 upon which a mounting platform 144 is located. The mounting platform 144 provides a location for mounting either a rotary drive mechanism 150 or a tank 610 (as described below in connection with FIGS. 6-10). The mounting platform 144 preferably has at least one adjustment knob 146 for loosening and tightening the mounting platform 144 so as to remove or attach the rotary drive mechanism 150 from or to the axial drive mechanism 140.

In one embodiment of the present balloon catheter measurement apparatus 100, the adjustment knob 146 can be configured so as to permit the rotary drive mechanism 150 to be attached to the mounting platform 144 of the axial drive mechanism 140. Once the rotary drive mechanism 150 is sufficiently attached to the axial drive mechanism 140, the adjustment knob 146 can be tightened so as to substantially fix the rotary drive mechanism 150 relative to the axial drive mechanism 140 such that the rotary drive mechanism 150 does not become dislodged from the balloon catheter measurement apparatus 100 during normal operating conditions.

The rotary drive mechanism 150 preferably includes a holding unit 152 capable of holding at least one balloon catheter. Other embodiments of the present balloon catheter measurement apparatus 100 may include holding units 152 that are capable of holding two or more balloon catheters so as to permit the measurement of the dimensions of two or more balloon catheters simultaneously. The holding unit 152 contains a first end and a second end that correspond to a first end and a second end of a balloon catheter. As such, the holding unit 152 preferably holds a balloon catheter in place by temporarily fixing each end of the balloon catheter to the rotary drive mechanism 150. In one embodiment, the balloon catheter is in a suspended position while in the holding unit 152 such that the outer surface of the balloon catheter is not in contact with any components of the balloon catheter measurement apparatus 100. Advantageously, such a suspended configuration of the balloon catheter facilitates in measuring the entire outer surface of the balloon catheter since the measurement device 120 can measure substantially the entire outer surface of the balloon catheter without interference from components of the balloon catheter measurement apparatus 100.

In another embodiment, the rotary drive mechanism 150 is capable of rotating about a central axis defined by the balloon catheter. Such rotation permits the measurement device 120 to measure substantially the entire outer surface of the balloon catheter. In combination, the axial drive mechanism 140 and the rotary drive mechanism 150 permit a balloon catheter to simultaneously translate in an axial direction and rotate about a central axis. As a result, improved measurements of the balloon catheter can be achieved since the measurement device 120 can automatically measure substantially all portions of the balloon catheter as the balloon catheter passes through a measurement area of the balloon catheter measurement apparatus 100.

As shown in FIG. 1, the measurement device 120 is preferably located substantially near the axial drive mechanism 140 and the rotary drive mechanism 150. In one embodiment, the measurement device 120 is suspended and supported by a support bracket 122. As a result, the measurement device 120 can measure the dimensions of a manufactured balloon catheter that is disposed in the holding unit 152 of the rotary drive mechanism 150.

In another embodiment, the measurement device 120 comprises a laser measurement device. The laser measurement device can comprise a laser micrometer having laser diodes and laser sensors for providing measurements of a particular cross-section of a balloon catheter. In one embodiment, the measurement device 120 can comprise a Mitutoyo Laser Micrometer Model 9506. In another embodiment, the measurement device 120 can comprise a Keyence Laser Micrometer Model LS-7000.

Advantageously, the laser measurement system constructed according to embodiments of the present invention offers a highly accurate, non-contact technique for multipoint inspection of balloon catheter dimensions. The system is a substantial improvement over traditional manual balloon catheter measurement procedures. Due to the automated nature of the balloon catheter measurement apparatus 100, the laser measurement system eliminates errors associated with manual contact measurements and also eliminates errors due to operator skills.

As shown in FIG. 1, a control unit 160 is coupled to at least the measurement device 120, the axial drive mechanism 140, and the rotary drive mechanism 150. The control unit 160 provides a user interface for a laser micrometer and a personal computer which can be attached to the balloon catheter measurement apparatus 100. The control unit 160 provides measurement data obtained from the measurement device 120 and allows a user to compile measurement data in a variety of forms including graphical form and tabular form. In one embodiment, the control unit 160 is capable of controlling motor positioning of both the axial drive mechanism 140 and the rotary drive mechanism 150. In addition, the control unit 160 can control the temperature setting of gas provided to the balloon catheter and the pressure and air flow of gas provided to the balloon catheter. In one embodiment, the control unit 160 has an LED display which provides real time measurements of a balloon catheter's dimensions.

Figure 2:
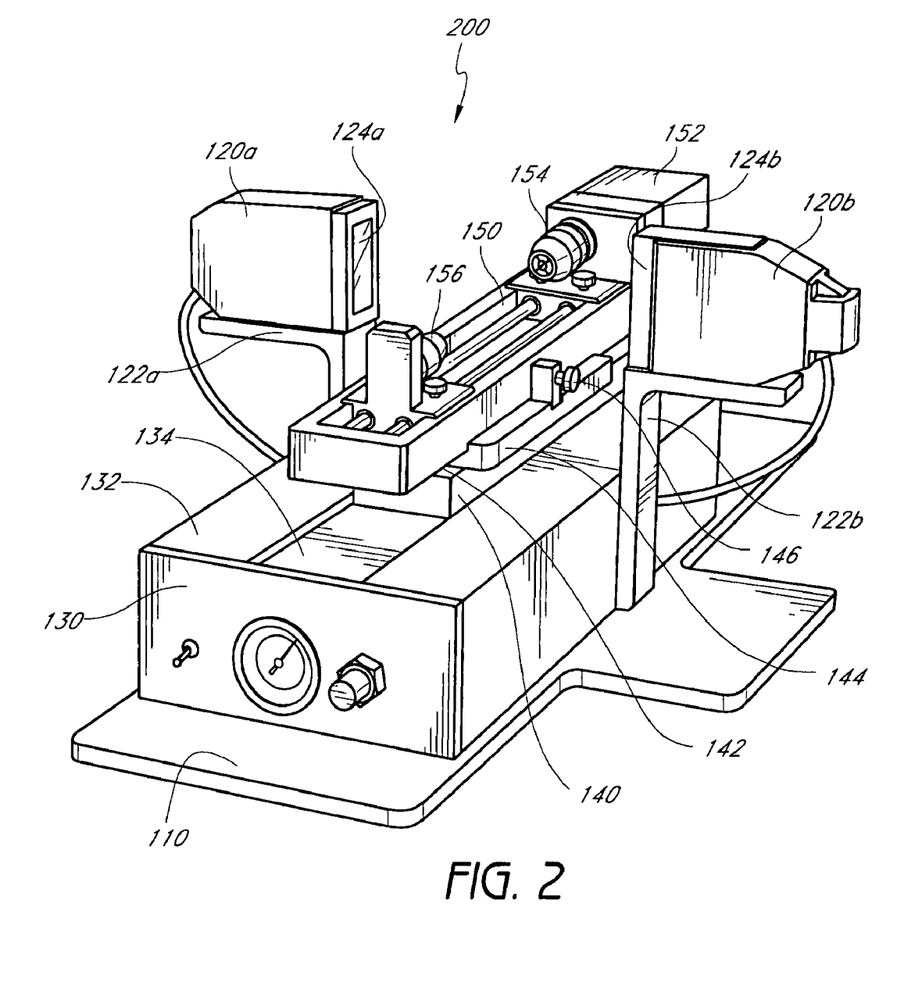
FIG. 2 is a perspective view of a measurement assembly including an axial drive mechanism and a rotary drive mechanism of the balloon catheter measurement apparatus as shown in FIG. 1.

With reference to FIG. 2, a perspective view of a measurement assembly 200 is shown. The measurement assembly 200 includes many of the components described above with respect to FIG. 1. However, the measurement assembly 200 does not include the control unit 160 described above. The measurement assembly 200 is preferably portable so that it can be transported easily from one location to another location within an industrial setting.

As shown in FIG. 2, the measurement device 120 includes a first measurement device 120a and a second measurement device 120b. In one embodiment, the first measurement device 120a is disposed on a first side of the measurement block 130 and the second measurement device 120b is disposed on a second side of the measurement block 130. Such configuration permits the measurement device 120 to measure all sides of a balloon catheter such that substantially the entire outer surface of a balloon catheter can be measured preferably by a laser micrometer.

In one embodiment of the present measurement assembly 200, a first window 124a is attached to a front portion of the first measurement device 120a and a second window 124b is attached to a front portion of the second measurement device 120b. The first window 124a and the second window 124b permit the measurement device 120 to emit laser energy from the measurement device 120 so as to measure the dimensions of a suspended balloon catheter. The first window 124a and the second window 124b can comprise laser diodes and laser sensors for measuring the outer dimensions of a balloon catheter.

The first measurement device 120a is preferably suspended and supported by a first support bracket 122a. The second measurement device 120b also is preferably suspended and supported by a second measurement bracket 122b. As a result, the measurement device 120 can emit laser energy toward the balloon catheter from both sides of the balloon catheter.

The holding unit 152 of the rotary drive mechanism 150 includes a first rotary clamp 154 and a second rotary clamp 156. In one embodiment, a first end of a balloon catheter is inserted into the first rotary clamp 154 and the first rotary clamp 154 can sufficiently tighten with respect to the first end of the balloon catheter. Likewise, a second end of the balloon catheter can be inserted into the second rotary clamp 156 such that the balloon catheter is substantially held in place in a position generally parallel to the measuring block 130. In this configuration, the balloon catheter is suspended in ambient air such that the first rotary clamp 154 and the second rotary clamp 156 are the only components of the measurement assembly 200 that come in contact with the balloon catheter.

When the rotary drive mechanism 150 is actuated to rotate, the first rotary clamp 154 and the second rotary clamp 156 rotate in a substantially simultaneous manner. As a result, the balloon catheter proceeds to rotate via its attachment to the first rotary clamp 154 and the second rotary clamp 156. In one embodiment, the rotary drive mechanism 150 can rotate the balloon catheter up to 360° in a clockwise direction. In another embodiment, the rotary drive mechanism 150 can rotate the balloon catheter up to 360° in a counter-clockwise direction. By use of the control unit 160, as shown in FIG. 1, a user can manipulate the balloon catheter by rotating it in either a clockwise direction or in a counter-clockwise direction so as to facilitate in measuring substantially the entire outer surface of a particular cross-section of the balloon catheter.

Figure 3:
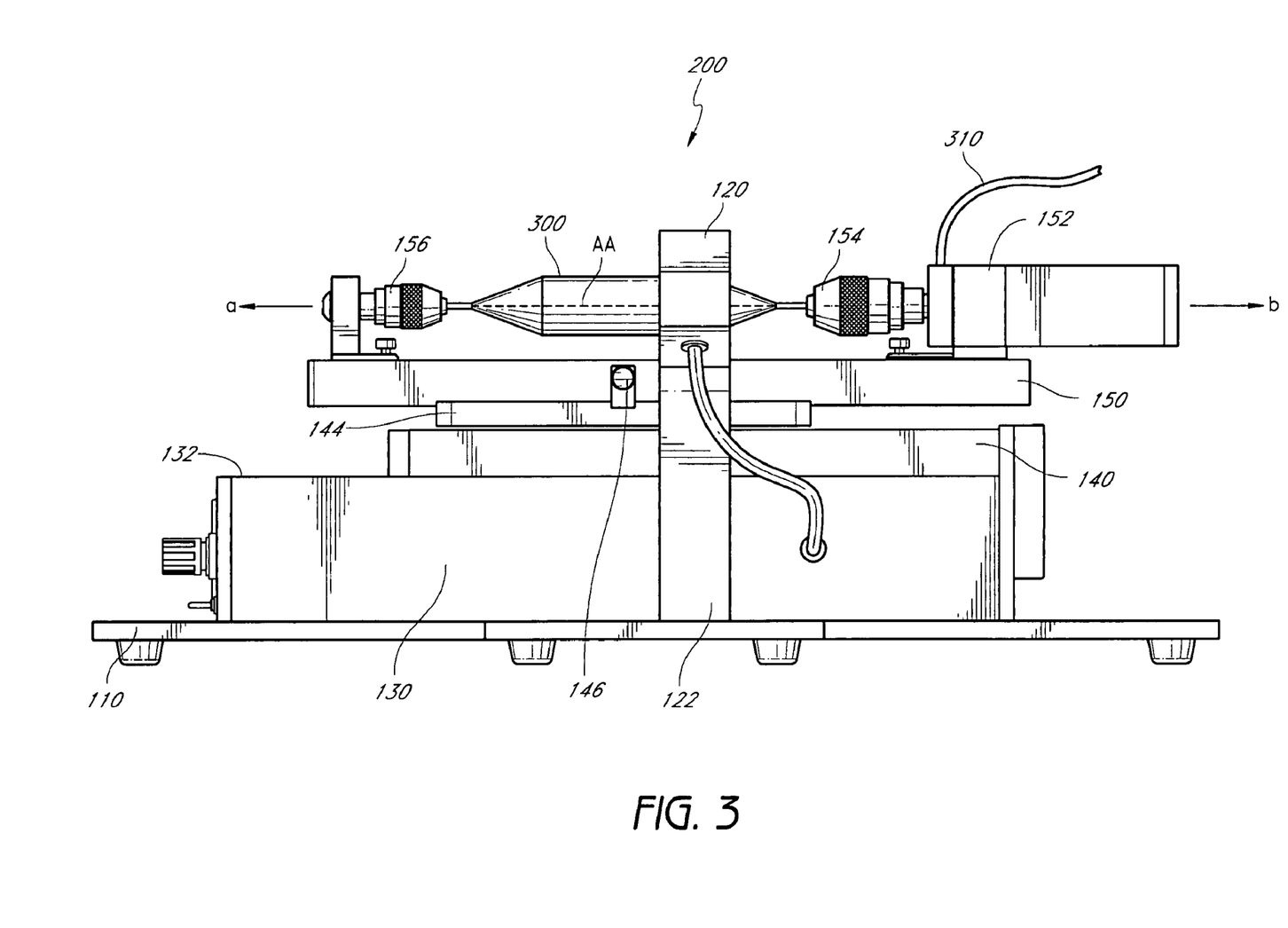
FIG. 3 is a side elevation view of a measurement assembly including an axial drive mechanism and a rotary drive mechanism of the balloon catheter measurement apparatus as shown in FIG. 1.

FIG. 3 shows a side elevation view of the measurement assembly 200. A balloon catheter 300 is shown attached to the first rotary clamp 154 and the second rotary clamp 156 of the holding unit 152 of the rotary drive mechanism 150. The balloon catheter is in a suspended state relative to the rotary drive mechanism 150. A central axis AA is defined by the balloon catheter 300 such that the central axis AA runs through the center of the balloon catheter 300 along its longitudinal length. The balloon catheter 300 is capable of rotating about such central axis AA by actuating the rotary drive mechanism 150. As the balloon catheter 300 rotates and translates, it can be seen that the measurement device 120 can emit laser energy toward the balloon catheter 300 along substantially the entire outer surface of a particular cross-section of the balloon catheter 300.

The axial drive mechanism 140 is capable of translating in a first axial direction a and in a second axial direction b as shown in FIG. 3. The mounting platform 144 provides an interface between the axial drive mechanism 140 and the rotary drive mechanism 150. As a result, the rotary drive mechanism 150 and the balloon catheter 300 mounted thereon are capable of translating in a first axial direction a and in a second axial direction b in conjunction with the axial drive mechanism 140. Advantageously, this permits substantially the entire length of the balloon catheter 300 to be measured by the measurement device 120 since the balloon catheter 300 is capable of translating back and forth across the measurement area provided by the measurement device 120.

In another embodiment, the axial drive mechanism 140 has an axial movement range of 0 to 200 mm from one end of the measuring block 130 to the other end of the measuring block 130. When used in conjunction with the control unit 160, the axial drive mechanism 140 has an axial movement resolution of approximately plus or minus 0.1 mm. Therefore, precise axial movement of the balloon catheter 300 is possible.

The axial movement speed and acceleration can vary depending on a particular user's application. However, in one embodiment, the axial movement speed of the axial drive mechanism 140 ranges from 0 to 200 mm/s. As a result, a non-stationary balloon catheter 300 can translate in an axial direction from one end of the measurement block 130 to the other end of the measurement block 130 in approximately one second. In another embodiment, the axial drive mechanism 140 can accelerate and decelerate at a rate of 0.1 mm/s$^2$ to 1000 mm/s$^2$.

In yet another embodiment, the rotary drive mechanism 150 is capable of rotating 0 to 360° in both the clockwise and counter-clockwise direction. Such rotation is preferably accurate to within plus or minus 1°. The rotational speed varies among embodiments of the present balloon catheter measurement apparatus 100. In one embodiment, however, the rotational speed of the rotary drive mechanism 150 preferably ranges from 0.36 rpm to 600 rpm.

In another embodiment, a tube 310 is coupled to the holding unit 152 of the rotary drive mechanism 150. The tube 310 is configured so as to be connected at least in part to a balloon catheter 300 mounted in the holding unit 152. As a result, the tube 310 can deliver gas from a gas source to the balloon catheter 300 so as to inflate the balloon catheter 300 with a desired quantity of gas prior to measuring the balloon catheter's dimensions. Preferably, the tube 310 delivers nitrogen to the interior of the balloon catheter 300 at a pressure level of approximately 30 atm. The gas source preferably has an output pressure range of 0 to 68 atm. The tube 310 is not limited to delivering nitrogen to the balloon catheter 300 and, as such, the balloon catheter can be inflated with a variety of other gases to suit the needs of a particular user.

Figure 4:
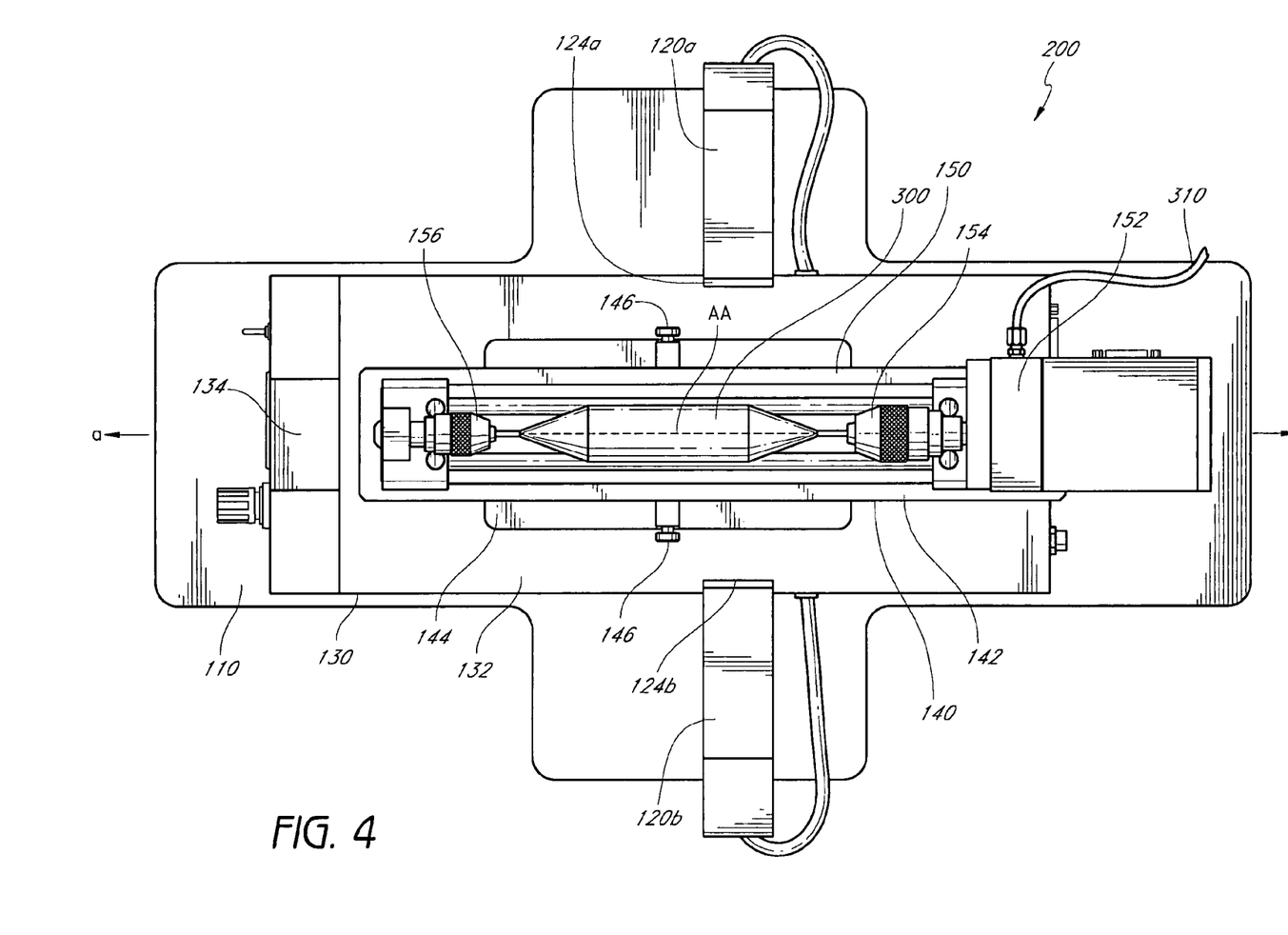
FIG. 4 is a top plan view of a measurement assembly including an axial drive mechanism and a rotary drive mechanism of the balloon catheter measurement apparatus as shown in FIG. 1.

FIG. 4 illustrates a top plan view of the measurement assembly 200 of the balloon catheter measurement apparatus 100. FIG. 4 further shows the central axis AA disposed along the longitudinal center of the balloon catheter 300. In addition, it can be seen that the first measurement device 120a and the second measurement device 120b lie in substantially the same plane so as to provide a measurement area defined as being between the first measurement device 120a and the second measurement device 120b.

Figure 5:
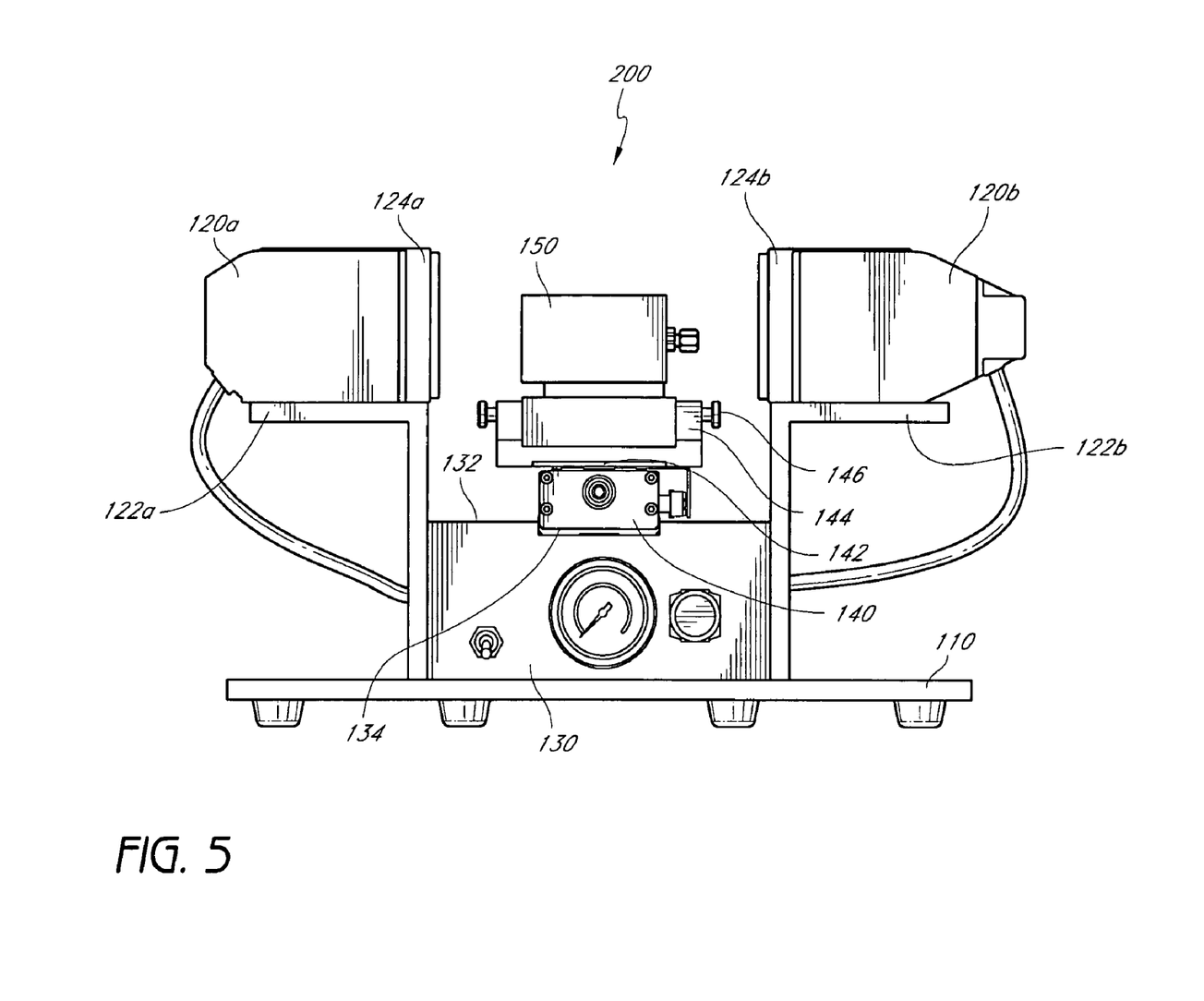
FIG. 5 is a front elevation view of a measurement assembly including an axial drive mechanism and a rotary drive mechanism of the balloon catheter measurement apparatus as shown in FIG. 1.

FIG. 5 illustrates a front elevation view of the measurement assembly 200 of the balloon catheter measurement apparatus 100. It can be seen that the rotary drive mechanism 150 lies between the first measurement device 120a and the second measurement device 120b. In addition, the rotary drive mechanism 150 lies at a substantially similar vertical level as the first measurement device 120a and the second measurement device 120b so that the measurement device 120 can emit laser energy in the general direction of the balloon catheter so as to measure the outer dimensions of the balloon catheter.

Figure 6:
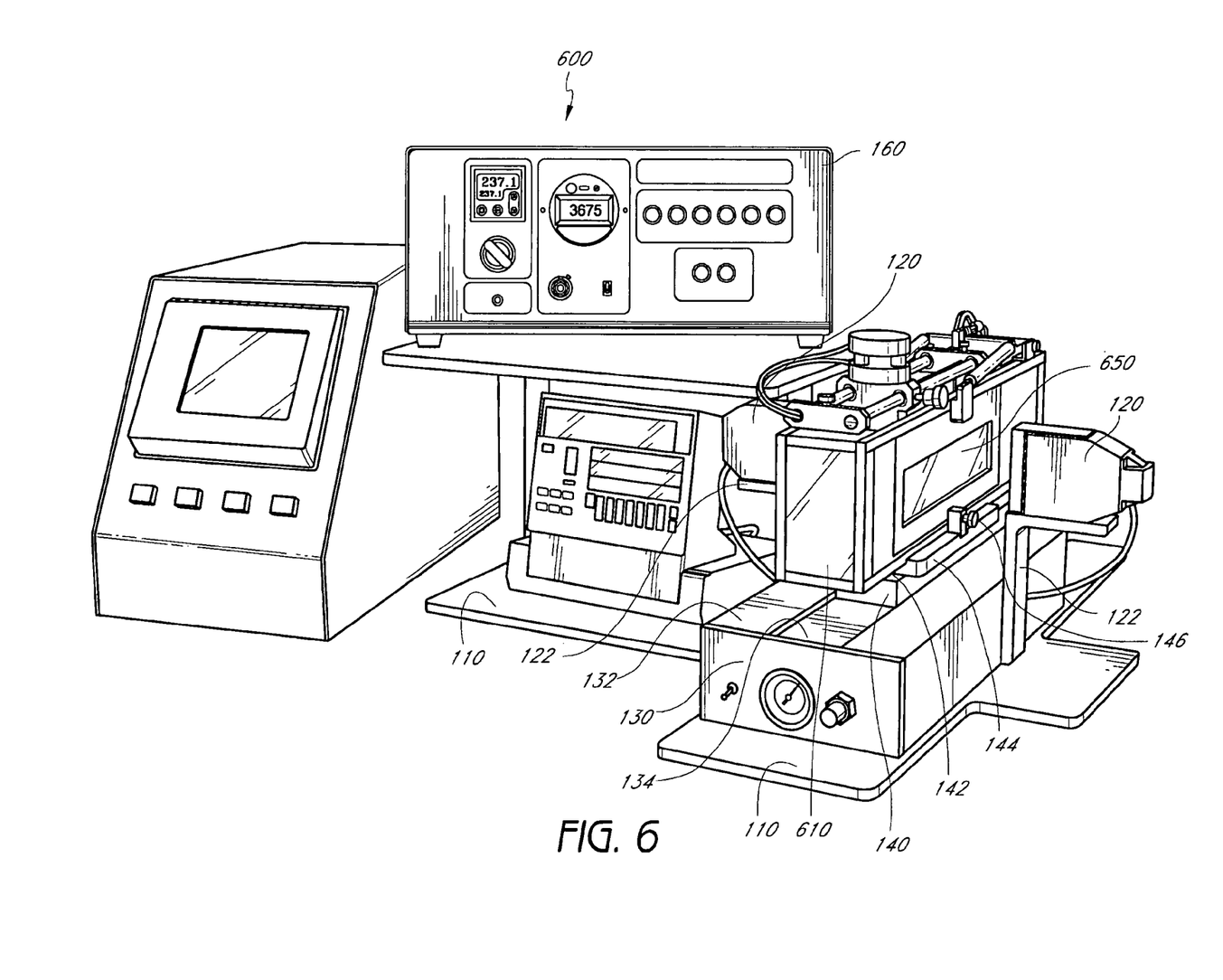
FIG. 6 is a perspective view of a balloon catheter measurement apparatus for measuring the burst pressure of a balloon catheter.

FIG. 6 shows a balloon catheter measurement apparatus 600 that is used to measure the burst pressure of a balloon catheter. The balloon catheter measurement apparatus 600 can also be used for other balloon catheter compliance measurements. Many of the components of the balloon catheter measurement apparatus 600 are the same as the components of the balloon catheter measurement apparatus 100 as shown in FIG. 1 (and described above in connection with FIGS. 1 through 5). As a result, the discussion of the balloon catheter measurement apparatus 600 which follows will focus on components that are not present in the balloon catheter measurement apparatus 100 as shown in FIG. 1. In addition, discussion of the balloon catheter measurement apparatus 600 will focus on functions of the balloon catheter measurement apparatus 600 that are different from functions of the balloon catheter measurement apparatus 100 as shown in FIG. 1.

The primary difference in the embodiment shown in FIG. 6 is that the balloon catheter measurement apparatus 600 includes a tank 610 instead of a rotary drive mechanism 150 as shown in FIG. 1. The tank 610 is preferably a water tank that is capable of holding water. The tank 610 can also heat such water as desired for measuring the burst pressure of an inflated balloon catheter submerged in the tank 610. The tank 610 provides an alternative holding and movement fixture that facilitates in measuring the burst pressure of a balloon catheter as opposed to measuring the outer dimensions of a balloon catheter.

Figure 7:
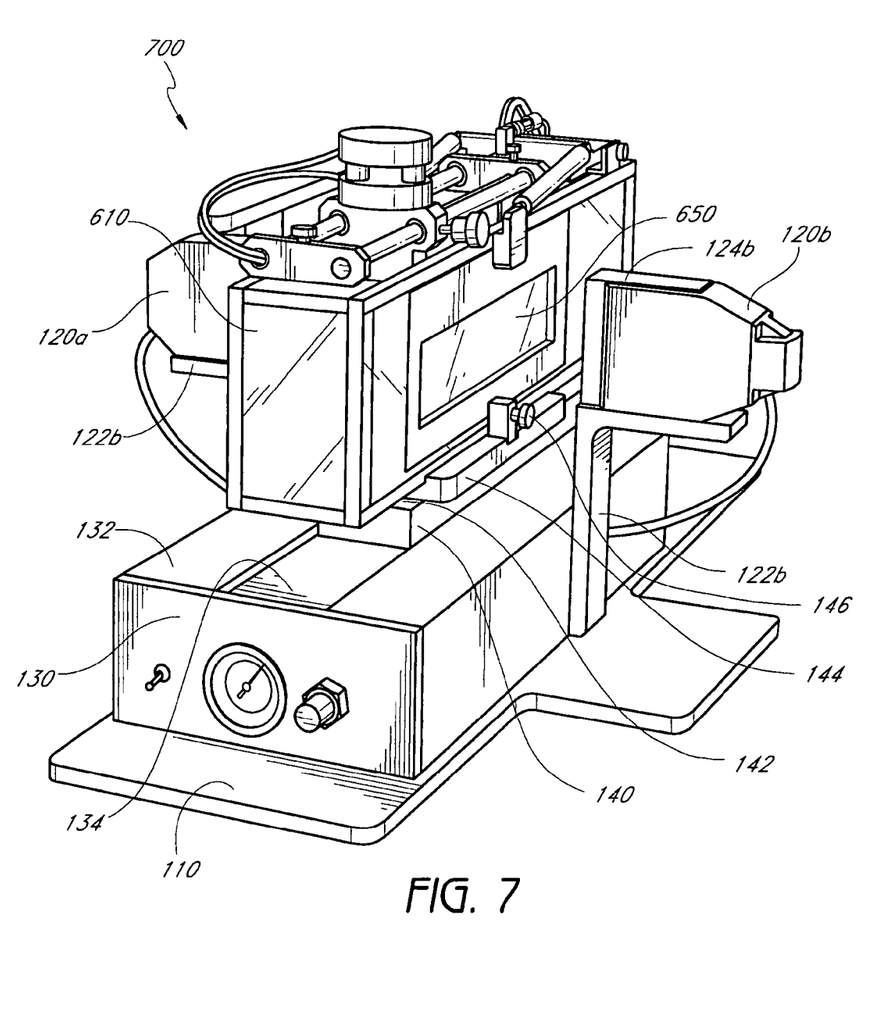
FIG. 7 is a perspective view of a measurement assembly including an axial drive mechanism and a tank of the balloon catheter measurement apparatus as shown in FIG. 6.

In one embodiment, the tank 610 defines an interior volume that is capable of holding up to two liters of water or other liquid. The tank 610 includes a heater cartridge running along the length of the tank 610 preferably on a bottom surface of the tank 610. The heater cartridge is coupled to the control unit 160 so that the heater cartridge can control the temperature of the water bath in the tank 610. In another embodiment, the tank 610 has transparent sides formed of an optical grade glass which allows laser light to pass through such transparent sides. In another embodiment, the tank 610 comprises four side walls and a bottom surface as shown in FIGS. 6 and 7. In one embodiment, the tank 610 is composed of a durable polycarbonate material. Advantageously, such a polycarbonate tank 610 is shatter-proof resistant and provides a preferable alternative to a glass tank. The polycarbonate tank 610 is preferably light weight and offers high strength and durability as well as sufficient flexibility so as to withstand the application of water pressure within the tank 610.

During operation, a balloon catheter is preferably inflated with distilled water. In one preferred embodiment, the distilled water is delivered by a pressure tester such as the Model PT-3070 Hydraulic Burst Pressure Tester provided by Interface Associates, Inc. of Laguna Niguel, Calif. In addition, the water pressure and flow rate may be controlled and varied by the control unit 160 according to a pre-programmed test protocol.

The balloon catheter measurement apparatus 600 is not limited to measuring the burst pressure of a balloon catheter. In one embodiment, the measurement apparatus 600 can measure the outer dimensions of a balloon catheter at various applied pressure levels. In another embodiment, the measurement apparatus 600 can measure the interior volume of an inflated balloon catheter. In one embodiment, the interior volume of a submerged, inflated balloon catheter can be measured by measuring the delivered volume of water to the interior of the balloon catheter.

When measuring the outer dimensions of a submerged balloon catheter, the balloon catheter is preferably inflated with water. Then, pressure is applied to the balloon catheter via a pressure applicator. Hydraulic pressure is increased such that the balloon catheter will naturally expand in a direction parallel to the balloon catheter's longitudinal axis. In addition, the balloon catheter will expand in a radial direction such that the outer diameter of the balloon catheter will increase along the length of the balloon catheter as hydraulic pressure is increased.

Hydraulic pressure may be increased in a variety of ways. In one embodiment, the hydraulic pressure in the water tank is increased according to a stepped function. In such embodiment, the pressure is increased incrementally in substantially uniform steps. As the pressure is increased in such steps, the submerged balloon catheter will tend to expand and its outer diameter will correspondingly increase. In another embodiment, pressure is applied in a cyclical manner such that a relatively large amount of pressure is applied to the balloon catheter followed by smaller amounts of pressure. This process is repeated resulting in a repeating cycle of large and small amounts of pressure being applied to the balloon catheter.

The axial drive mechanism 140 translates the water tank 610 in a direction generally parallel to the longitudinal axis of the submerged balloon catheter. The water tank 610 thus translates axially with respect to the measurement device 120 such that the measurement device 120 can measure the outer diameter of the balloon catheter at various cross-sections along the length of the balloon catheter. These measurements are sent to the control unit 160 and the control unit 160 can display outer diameter dimensions of the inflated balloon catheter at various pressure levels. Advantageously, such measurements permit one to predict how an inflated balloon catheter will behave and react to varying pressure conditions within the human body.

FIG. 7 illustrates a perspective view of a measurement assembly 700, including a tank 610, of the balloon catheter measurement apparatus 600 as shown in FIG. 6. In one embodiment, the tank 610 is mounted to the mounting platform 144 disposed on an upper surface 142 of the axial drive mechanism 140. The adjustment knob 146 allows the tank 610 to be attached to and detached from the mounting platform 140. Similar to the rotary drive mechanism 150 as shown in FIG. 2, the tank 610 is disposed between a first measurement device 120a and a second measurement device 120b. As a result, the measurement device 120, preferably a laser measurement device, is capable of measuring the burst pressure of a submerged, inflated balloon catheter located within the heated water tank 610.

In one embodiment, the tank 610 includes a window plate insert 650 disposed on at least one side of the tank 610. The window plate insert 650 preferably comprises a 0.375 inch thick glass plate composed of an optical grade glass. Advantageously, the optical grade glass provides optically transparent material so as to permit laser energy to pass through the window plate insert 650 more effectively than through the sides of the tank 610 which, in one embodiment, are composed of polycarbonate material. In addition, the window plate insert 650 is less susceptible to fogging than the sides of the tank 610 so as to facilitate visual inspection of the submerged balloon catheter during the burst pressure measurement process. In another embodiment, the tank 610 includes two window plate inserts located on opposite sides of the tank 610. In such embodiment, the two window plate inserts can be disposed substantially parallel to each other so as to permit sufficient laser light to pass through such window plate inserts and measure the burst pressure of a balloon catheter 800.

Figure 8:
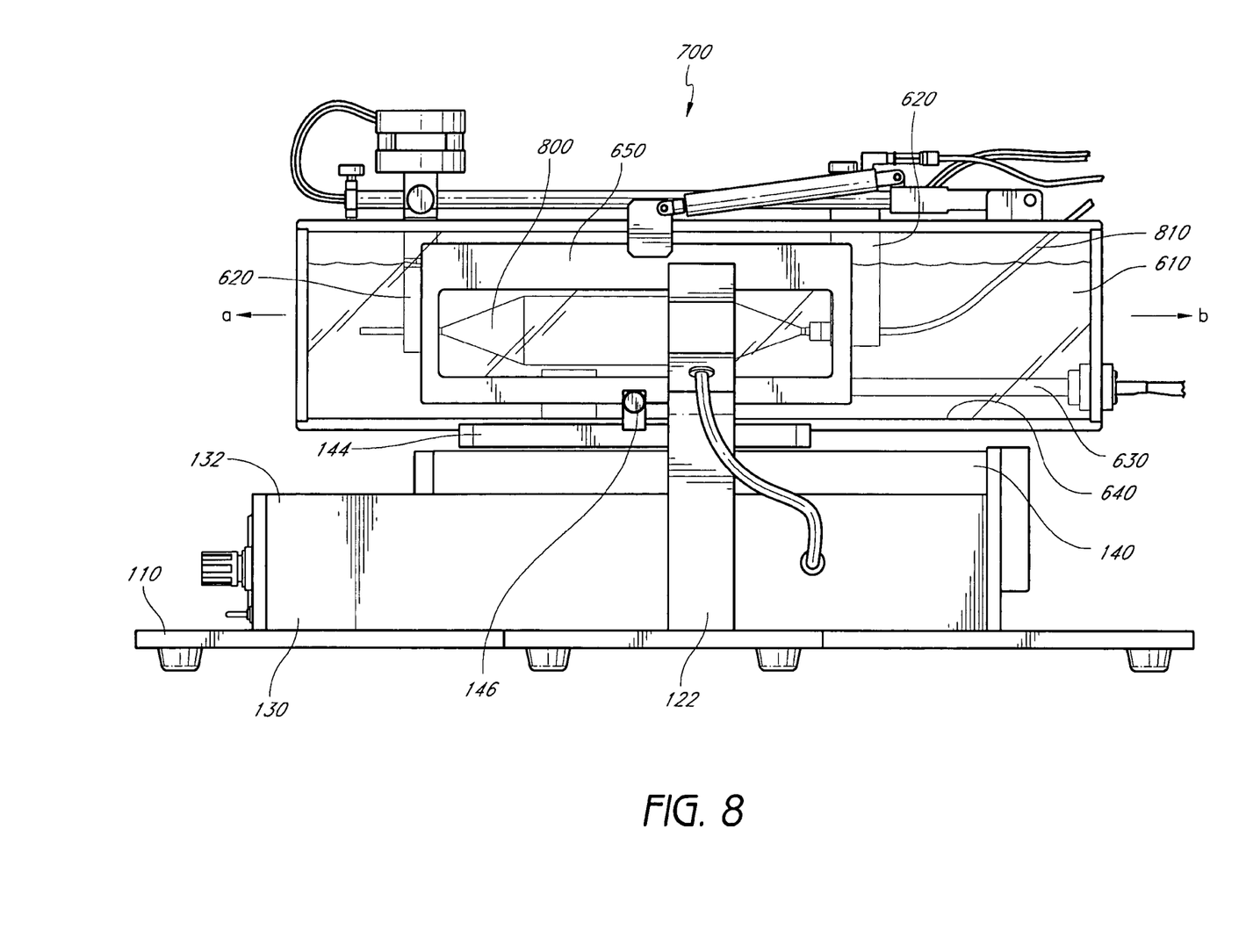
FIG. 8 is a side elevation view of a measurement assembly including an axial drive mechanism and a tank of the balloon catheter measurement apparatus as shown in FIG. 6.

FIG. 8 shows a side elevation view of the measurement assembly 700. A balloon catheter 800 is shown submerged in a liquid contained in the water tank 610. The holding unit 620 of the tank 610 holds the balloon catheter 800 in place and ensures that the balloon catheter 800 remains submerged during the burst pressure measurement process. In one embodiment, the holding unit 620 attaches to the balloon catheter 800 at each end of the balloon catheter as shown in FIG. 8. In another embodiment, the holding unit 620 is configured so as to permit the ends of the balloon catheter 800 to expand in an axial direction. As a result, the submerged balloon catheter will be allowed to naturally expand so as to not prematurely rupture during the burst pressure measurement process when significant pressure is applied to the balloon catheter 800.

In one embodiment of the measurement assembly 700, the tank includes a heater cartridge 630 that runs along substantially the entire length of a bottom surface 640 of the tank 610. The heater cartridge 630 is coupled to the control unit 160, as shown in FIG. 6, and allows the liquid in the water tank to be heated to a desired temperature. Advantageously, heated water allows a user to simulate actual conditions that a balloon catheter 800 may be subject to. For example, when a balloon catheter is inserted into the human body, such balloon catheter is often immersed in relatively warm liquid conditions. As a result, the heater cartridge 630 allows the burst pressure of the balloon catheter to be measured in an environment substantially similar to the human body. In one embodiment of the balloon measurement system 600, burst pressure testing is conducted in water at approximately 37° C. in order to substantially simulate the temperature experienced by a balloon catheter when deployed in the human body. Preferably, the water temperature can vary from ambient water temperature to approximately 50° C.

As shown in FIG. 8, a tube 810 is preferably coupled to the holding unit 620 of the tank 610 such that the tube 810 is capable of delivering water or gas to the balloon catheter 800. As a result, the submerged balloon catheter 800 can be filled with water via the tube 810. In one embodiment, the balloon catheter 800 is filled with distilled water. Once filled with water, the balloon catheter 800 can be pressurized in increasing amounts until the balloon ruptures. The pressure level at the point at which the balloon ruptures represents the burst pressure of the balloon catheter 800. In one embodiment, the balloon catheter 800 is preferably filled with distilled water via the tube 810.

It can be seen that the tank 610 is capable of translating in a first axial direction a and in a second axial direction b. Such axial translation is provided by the axial drive mechanism 140 in a substantially similar manner as described above in connection with FIGS. 1 through 5. Translating in a first axial direction a and in a second axial direction b permits the measurement device 120 to emit laser energy toward substantially the entire length of the balloon catheter 800 so as to sufficiently measure the burst pressure of the balloon catheter 800.

Figure 9:
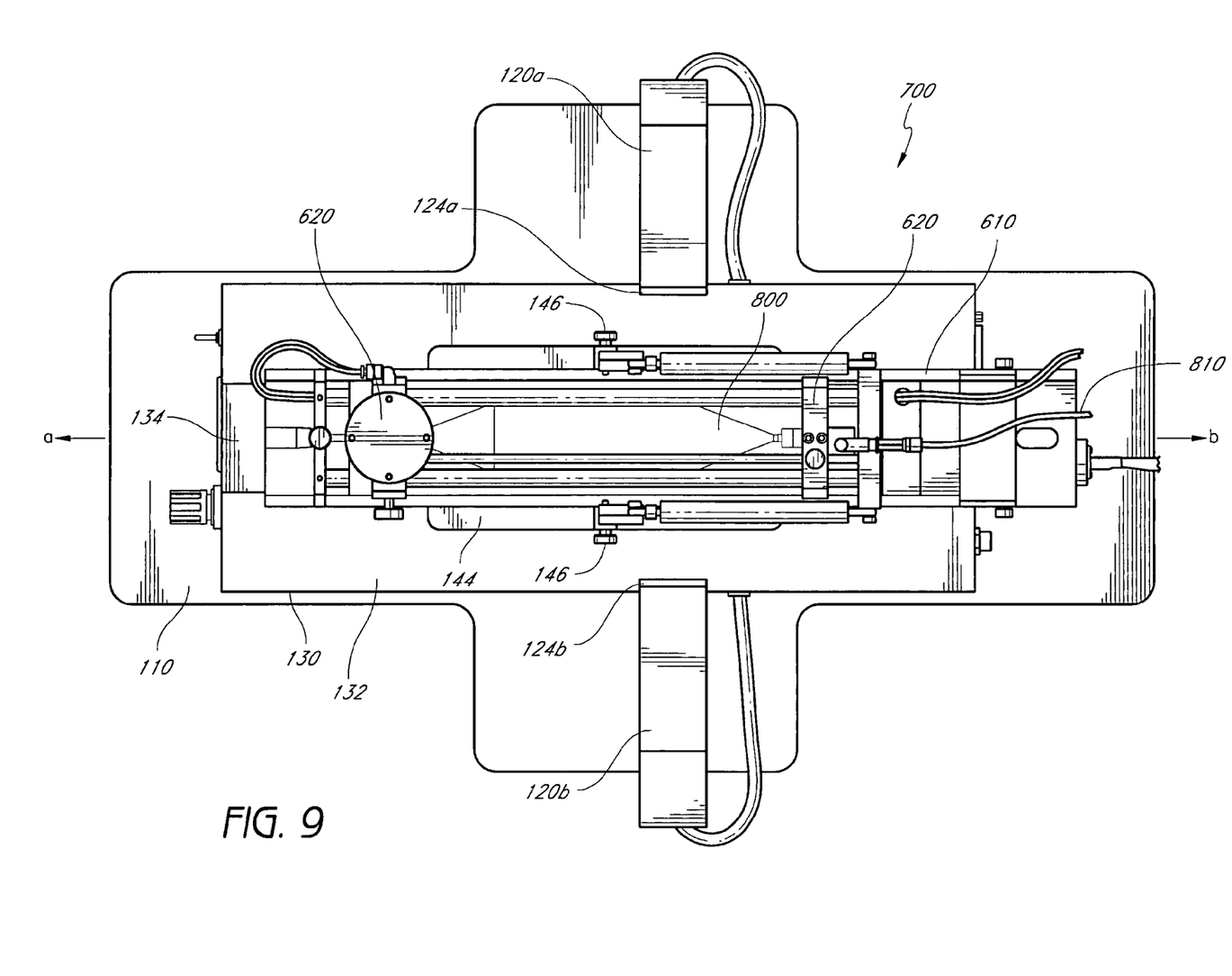
FIG. 9 is a top plan view of a measurement assembly including an axial drive mechanism and a tank of the balloon catheter measurement apparatus as shown in FIG. 6.
Figure 10:
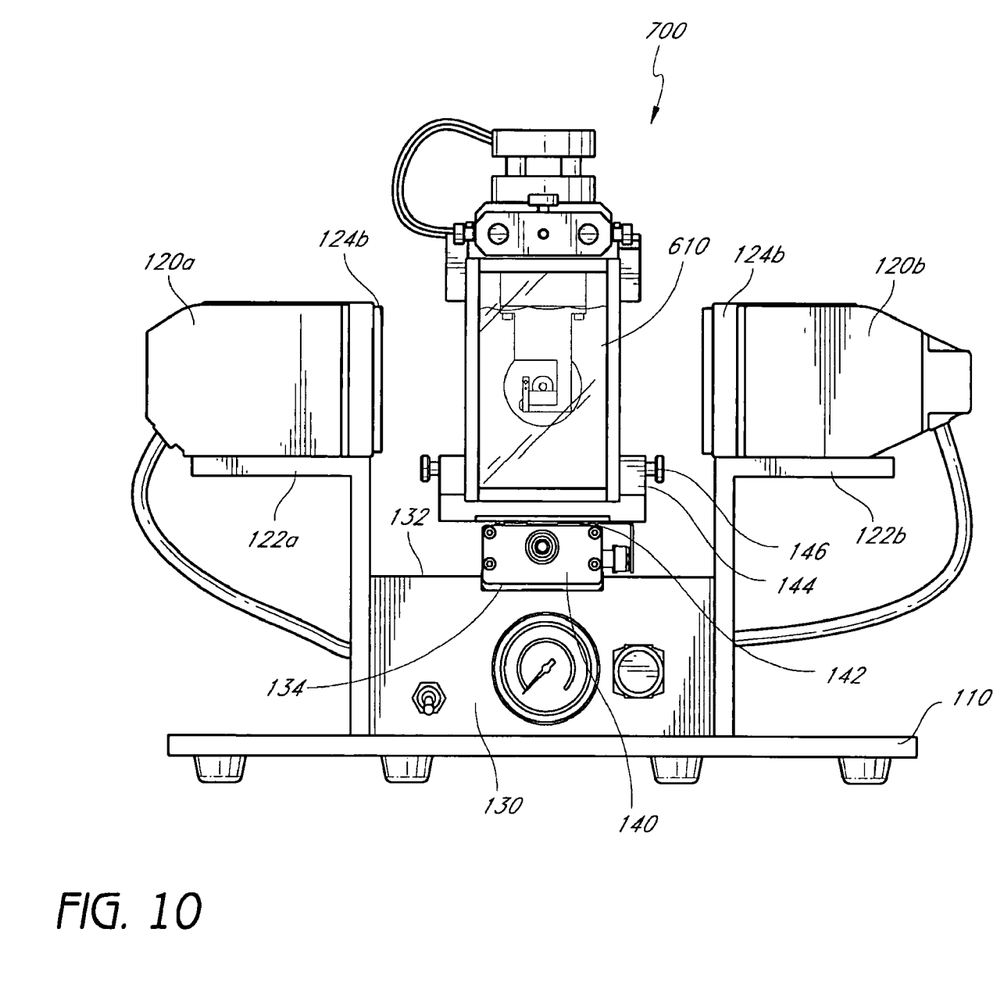
FIG. 10 is a front elevation view of a measurement assembly including an axial drive mechanism and a tank of the balloon catheter measurement apparatus as shown in FIG. 6.

As shown in FIG. 9, a top plan view of the measurement assembly 700 is provided. FIG. 9 shows a location of the tank 610 relative to the base plate 110, measurement block 130, the first measurement device 120a and the second measurement device 120b. In addition, the location of the tank 610 can be seen in FIG. 10, which shows a front elevation view of the measurement assembly 700 of the balloon catheter measurement apparatus 600 as shown in FIG. 6.

The above presents a description of the best mode contemplated for carrying out the present measurement system for measuring the dimensions and burst pressure of a balloon catheter, and of the manner and process of making and using it, in such full, clear, concise, and exact terms as to enable any person skilled in the art to which it pertains to make and use this apparatus. This laser measurement system is, however, susceptible to modifications, alternate constructions, and alternative method steps from those discussed above that are fully equivalent. Consequently, these laser measurement systems and methods are not limited to the particular embodiments disclosed. On the contrary, these laser measurement systems and methods cover all modifications and alternative constructions and methods coming within the spirit and scope of the present invention.

What is claimed is:

1. An apparatus for measuring dimensions of an inflated balloon catheter, comprising:
 a base plate;
 a laser measurement device disposed over at least a portion of the base plate;
 a measurement block disposed over at least a portion of the base plate and configured such that the measurement block lies substantially orthogonal to the laser measurement device, wherein the measurement block comprises an upper surface having a channel;
 an axial drive mechanism coupled to the channel of the upper surface of the measurement block, wherein the axial drive mechanism comprises a mounting platform disposed on an upper surface of the axial drive mechanism and the axial drive mechanism is capable of translating the mounting platform in an axial direction across at least a portion of the laser measurement device;
 a rotary drive mechanism capable of being attached to and detached from the mounting platform of the axial drive mechanism, wherein the rotary drive mechanism comprises a holding unit for holding a balloon catheter in a direction generally parallel to the axial direction and capable of rotating a balloon catheter clockwise and counter-clockwise about a central axis defined by the balloon catheter;
 a control unit coupled to the axial drive mechanism and the rotary drive mechanism, wherein the control unit is capable of actuating the axial drive mechanism to translate in an axial direction and capable of actuating the rotary drive mechanism to rotate about a central axis; and
 a tube coupled to the rotary drive mechanism for delivering gas to a balloon catheter so as to inflate the balloon catheter with a desired quantity of gas.

2. The apparatus of claim 1, wherein the base plate and the measurement block are composed of an aluminum alloy.

3. The apparatus of claim 1, wherein the laser measurement device comprises a laser micrometer having laser diodes and laser sensors for providing measurements of a particular cross-section of a balloon catheter.

4. The apparatus of claim 1, wherein the laser measurement device comprises a first end and a second end and a plane defined by the first end and second end such that a balloon catheter is capable of translating through the plane and the cross-sectional dimensions of the balloon catheter are measured when a particular cross-section of the balloon catheter passes through such plane.

5. The apparatus of claim 1, wherein the axial drive mechanism is capable of translating in an axial direction such that substantially the entire length of a balloon catheter can be measured by the laser measurement device.

6. The apparatus of claim 1, wherein the rotary drive mechanism is capable of rotating such that substantially the entire outer surface of a balloon catheter can be measured by the laser measurement device.

7. The apparatus of claim 1, wherein the control unit provides a user interface capable of controlling motor positioning, temperature settings, and gas settings.

8. A method for measuring dimensions of an inflated balloon catheter, comprising the steps of:
 providing a balloon catheter measurement apparatus comprising an axial drive mechanism and a rotary drive mechanism;

mounting a balloon catheter to a holding unit of the rotary drive mechanism;

actuating the axial drive mechanism for translating the balloon catheter in an axial direction across at least a portion of a measurement device;

actuating the rotary drive mechanism for rotating the balloon catheter so as to permit the measurement device to measure a particular cross-section of the balloon catheter; and using the measurement device to measure particular dimensions of the balloon catheter.

9. The method of claim 8 further comprising the step of attaching the rotary drive mechanism to a mounting platform of the axial drive mechanism.

10. The method of claim 8, wherein the measurement device measures the outer diameter of the balloon catheter.

11. The method of claim 8, wherein the balloon catheter that is mounted to the holding unit of the rotary drive mechanism comprises a deflated balloon catheter.

12. The method of claim 11 further comprising the step of supplying gas to the deflated balloon catheter via the rotary drive mechanism so as to inflate the balloon catheter with a desired quantity of gas.

13. The method of claim 8, wherein the measurement device comprises a laser micrometer.

14. The method of claim 13 further comprising the step of emitting laser energy from the laser micrometer at least partially toward the balloon catheter.

15. The method of claim 14 further comprising the step of measuring the laser energy so as to determine the outer diameter of the balloon catheter along at least a portion of the balloon catheter.

16. An apparatus for measuring dimensions of an inflated balloon catheter, comprising:

a measurement device;

a measurement block disposed substantially near the measurement device;

an axial drive mechanism coupled to the measurement block, wherein the axial drive mechanism is capable of translating in an axial direction;

a rotary drive mechanism coupled to the axial drive mechanism, wherein the rotary drive mechanism is capable of holding a balloon catheter and rotating such balloon catheter about a central axis defined by the balloon catheter; and a control unit coupled to the axial drive mechanism and the rotary drive mechanism.

17. The apparatus of claim 16, wherein the measurement block lies substantially orthogonal to the measurement device.

18. The apparatus of claim 16, wherein the measurement block is composed of an aluminum alloy.

19. The apparatus of claim 16, wherein the axial drive mechanism is capable of translating in an axial direction such that substantially the entire length of a balloon catheter can be measured by the measurement device.

20. The apparatus of claim 16, wherein the rotary drive mechanism is capable of rotating a balloon catheter in a clockwise and counter-clockwise manner.

21. The apparatus of claim 16, wherein the rotary drive mechanism is capable of rotating such that substantially the entire outer surface of a balloon catheter can be measured by the measurement device.

22. The apparatus of claim 16, wherein the control unit is capable of actuating the axial drive mechanism to translate in an axial direction and capable of actuating the rotary drive mechanism to rotate about a central axis.

23. The apparatus of claim 16, wherein the control unit provides a user interface capable of controlling motor positioning, temperature settings, and gas settings.

24. The apparatus of claim 16 further comprising a tube coupled to the rotary drive mechanism for delivering gas to a balloon catheter so as to inflate the balloon catheter with a desired quantity of gas.

25. The apparatus of claim 16, wherein the axial drive mechanism comprises a mounting platform disposed on an upper surface of the axial drive mechanism.

26. The apparatus of claim 25, wherein the rotary drive mechanism is capable of being attached to and detached from the mounting platform of the axial drive mechanism.

27. The apparatus of claim 16, wherein the measurement device comprises a laser measurement device.

28. The apparatus of claim 27, wherein the laser measurement device comprises a laser micrometer having laser diodes and laser sensors for providing measurements of a particular cross-section of a balloon catheter.

29. The apparatus of claim 27, wherein the laser measurement device comprises a first end and a second end and a plane defined by the first end and second end such that a balloon catheter is capable of translating through the plane and the cross-sectional dimensions of the balloon catheter are measured when a particular cross-section of the balloon catheter passes through such plane.

30. An apparatus for accurately measuring the outside diameter of an inflated balloon catheter, comprising:

a gas supply;

a rotatable balloon catheter coupled to said gas supply;

a measuring device capable of accurately measuring the outside diameter of said balloon catheter; and an axial drive mechanism adapted to provide linear translation between said measurement device and said rotating balloon catheter.

31. An apparatus for measuring the outside diameter of an inflated balloon catheter, comprising:

means for rotatably holding said inflated balloon catheter;

means for measuring the outside diameter of said inflated balloon catheter; and means for providing relative axial movement between said measuring means and said rotating balloon catheter.

* * * * *

UNITED STATES PATENT AND TRADEMARK OFFICE
CERTIFICATE OF CORRECTION

| | |
|---|---|
| PATENT NO. | : 7,578,165 B1 |
| APPLICATION NO. | : 11/303545 |
| DATED | : August 25, 2009 |
| INVENTOR(S) | : Josef J. Stupecky |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 652 days.

Signed and Sealed this

Seventh Day of September, 2010

David J. Kappos
*Director of the United States Patent and Trademark Office*